United States Patent [19]

Sjolund

[11] 4,221,071
[45] Sep. 9, 1980

[54] CRAB TRAP

[76] Inventor: Roger E. Sjolund, 1319 Maple Rd., Alderwood Manor, Wash. 98036

[21] Appl. No.: 7,304

[22] Filed: Jan. 29, 1979

[51] Int. Cl.$^3$ .............................................. A01K 69/08
[52] U.S. Cl. ........................................ 43/100; 43/102
[58] Field of Search ................ 43/100, 102, 105, 103, 43/104

[56] References Cited

U.S. PATENT DOCUMENTS

| 693,391 | 2/1902 | Holland | 43/100 |
| 2,219,981 | 10/1940 | Doan | 43/100 X |
| 2,530,449 | 11/1950 | Bush | 43/102 |
| 2,760,297 | 8/1956 | Buyken | 43/105 |
| 3,184,881 | 5/1965 | Jatzeck | 43/102 |
| 3,906,655 | 9/1975 | Lowenthal | 43/105 |
| 4,159,591 | 7/1979 | Plante | 43/100 |

FOREIGN PATENT DOCUMENTS 53210 10/1970 Australia ........................... 43/102

*Primary Examiner*—Nicholas P. Godici
*Attorney, Agent, or Firm*—Seed, Berry, Vernon & Baynham

[57] ABSTRACT

A conventional crab trap having improved means for preventing crabs from escaping from the trap and for adapting the trap to catch differing species of crab. Crabs enter the trap by crawling through a tunnel formed by four net panels terminating in a rectangular opening normally inaccessible to the crabs inside the trap. In practice, many of the crabs are able to reach the opening by crawling along the net panels. In order to prevent crabs from escaping in this manner, a triangularly shaped baffle is placed between the opening and one of the panels. The size of the opening may be varied as required by law when fishing for different species of crab by pivoting an edge mounted panel across part of the opening. The crab trap also includes several net panels supported by rectangular frames which are releasably secured to each other and to the trap in order to cover the escapement end of the trap. The panels have a smaller mesh than the mesh at the escapement end and they have several spaced apart tabs projecting from one of their edges which are inserted into corresponding apertures formed in an adjacent edge. A rigid, cross member extends between two opposite frame members in order to allow the size of the panel to be reduced by severing the frame members adjacent the cross member.

22 Claims, 13 Drawing Figures

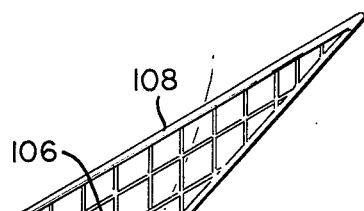
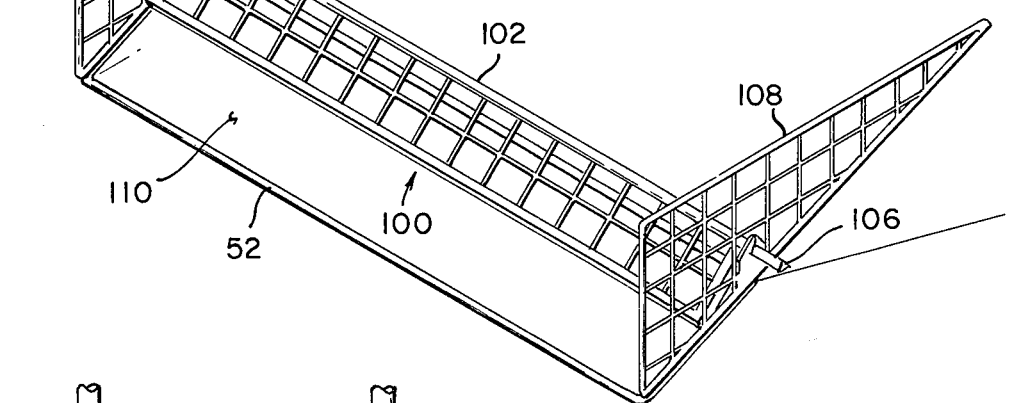
FIG. 7
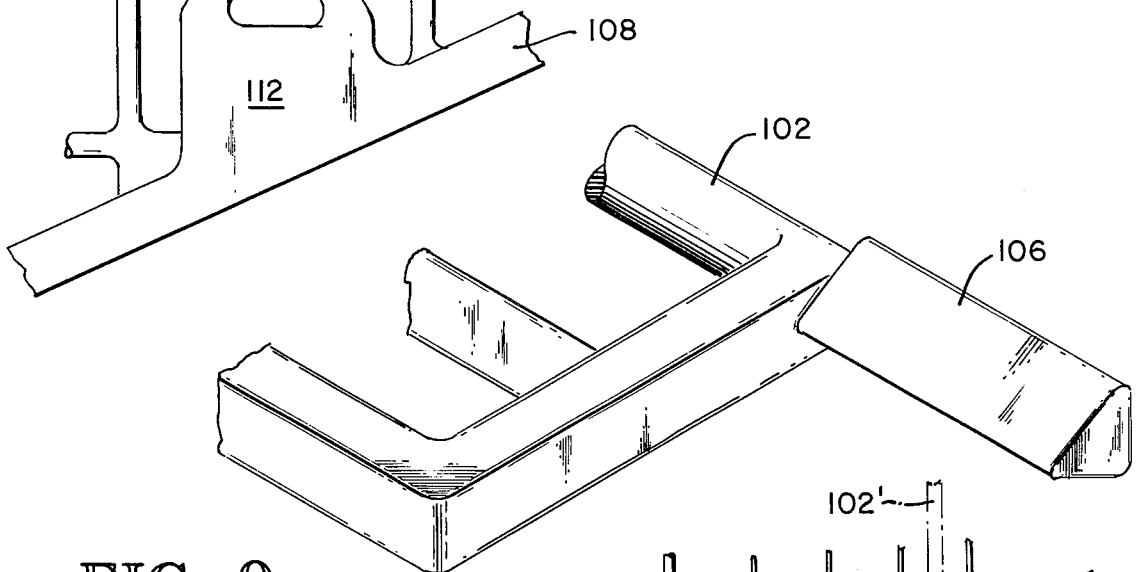
FIG. 8
FIG. 9
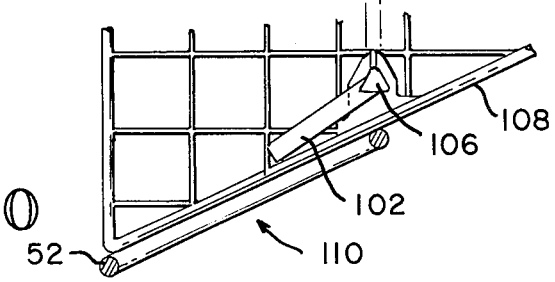
FIG. 10

CRAB TRAP

BACKGROUND OF THE INVENTION

1. Field of the Invention

This invention relates to crab traps and, more particularly, to structures for improving the yield and ease of use of conventional crab traps.

2. Description of the Prior Art

Conventional crab traps have been used in their present form for many years. These traps have an overall shape of a right prism formed by rectangular frames rigidly spaced apart from each other by support members. The frame members support a number of rectangular net panels and an entrance tunnel through which the crab crawls to enter the trap. The entrance tunnel is formed by a first net panel extending from one frame member inwardly and terminates along the far edge of an elongated, rectangular entrance frame facing upwardly intermediate the rectangular frames. A second net panel extends from the opposite frame member and terminates along the closer elongated edge of the entrance frame while a pair of third net panels extend from the corners of the trap and terminate along opposite sides of the entrance frame. A crab enters the trap by crawling along the first panel and through the entrance frame. As the trap fills with crabs, the bait becomes completely surrounded by the crabs and it is thus inaccessible to other crabs in the trap. Consequently, many of the crabs lose interest in remaining in the trap and seek escape. It has been estimated that, for large catches, 40% to 50% of the crabs entering the trap previous example of the conventional approach, a fewer number of crabs enter the trap.

Conventional crab traps are utilized to fish different species of crabs. In Alaskan waters, King and Tanner crabs are the principal species of crabs which are caught. When fishing for King crab, which is substantially larger than Tanner crab, the law requires that the netting an "escapement" end of the trap have a mesh which is large enought to allow Tanner crabs to escape. However, when that same trap is used to fish for Tanner crab, it is necessary to reduce the size of the opening formed by the entrance frame and to also reduce the size of the mesh covering the escapement end so that the Tanner crabs cannot escape.

At present, the opening formed by the entrance frame is usually narrowed by securing a board to the frame along one longitudinal edge of the frame, typically by using large rubber bands. The primary disadvantages of this approach are the down time required to convert the traps from one species to another and the tendency of the board to move away from the longitudinal edge and hence entirely block the entrace to the trap.

The relatively large mesh netting covering the escapement end of the trap is normally converted to a smaller mesh by either of two conventionally used techniques. The simplest technique is to simply tie a net over the escapement end of the trap. The second technique is to mount a rectangular frame having a smaller mesh over the escapement end of the trap. The principal disadvantage of the last mentioned technique is the need to buy, store and carry various size frames to fit various size crab traps.

ment end thereof. The panels are formed by a rigid rectangular frame having netting extending therebetween. A cross member to which the netting is also secured allows the size of the panel to be reduced simply by severing the frame adjacent the cross member so that the panels can be adapted for a variety of crab trap sizes. One edge of each panel preferably has formed therein several outwardly projecting tabs and correspondingly numbered and positioned apertures along the opposite edge. The panels can thus be secured to each other by inserting the tabs of one panel into the aperture of an adjacent panel. The size of the opening formed by the entrance frame may be easily and quickly reduced as required by law when fishing for smaller species of crabs by pivoting a panel mounted along one longitudinal edge of the frame to a position where a portion of the opening is covered. The panel may be mounted between either the anti-escape panels or a pair of brackets which are secured to the entrance frame.

BRIEF DESCRIPTION OF THE DRAWINGS

FIG. 7 is an isometric view of the panel for reducing the size of the entrance opening to the crab trap mounted between a pair of anti-escape baffles.

FIG. 8 is a side elevational view showing the portion of the anti-escape baffle on which the panel is mounted.

FIG. 9 is an isometric view showing the triangularly shaped pin projecting from the panel.

FIG. 10 is a side elevational view illustrating the two positions of the panel with respect to the anti-escape barriers.

DETAILED DESCRIPTION OF THE INVENTION

Figure 1:
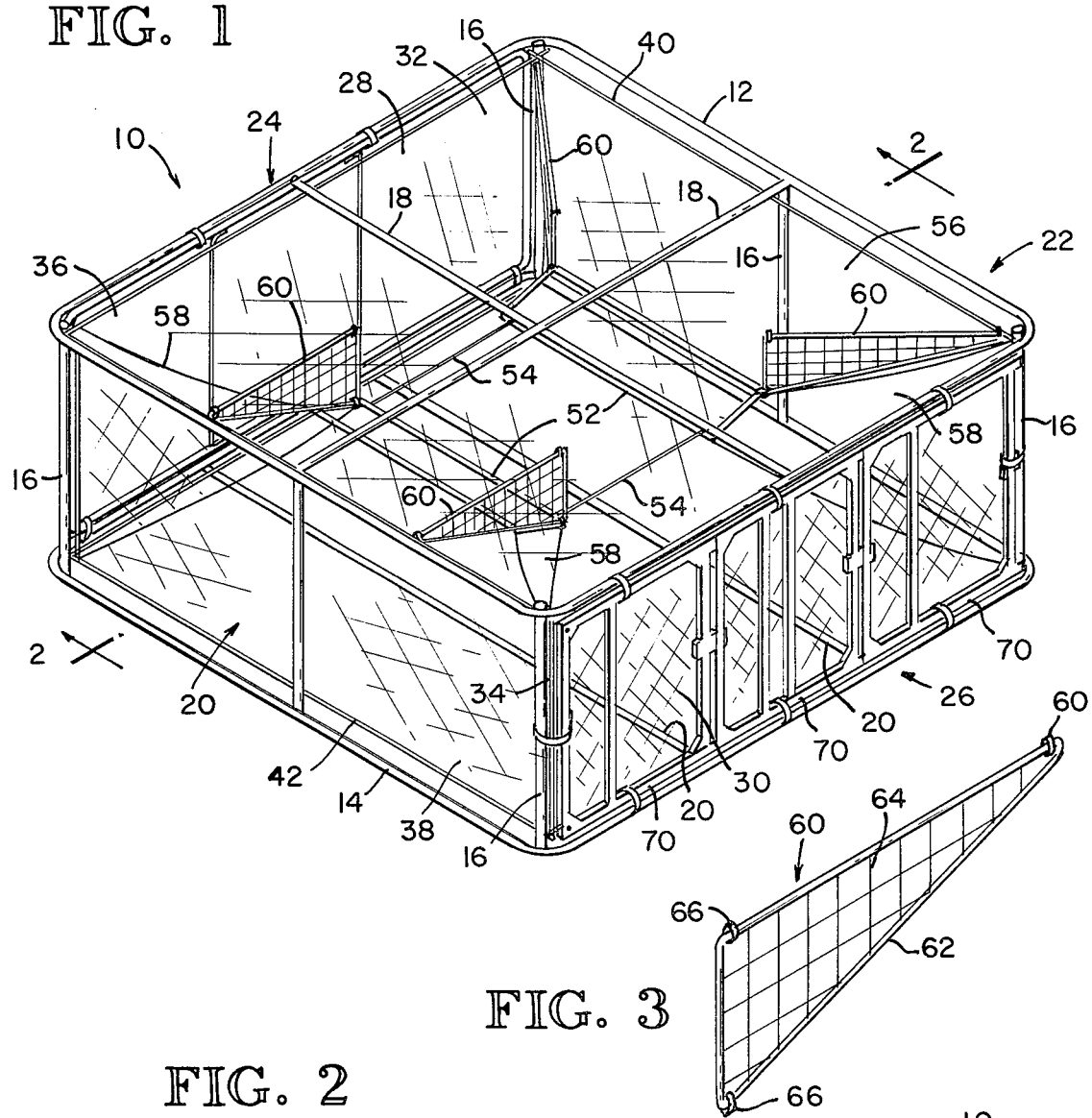
FIG. 1 is an isometric view of a conventional crab trap having the anti-escape baffle and the smaller mesh panels installed therein.
Figure 2:
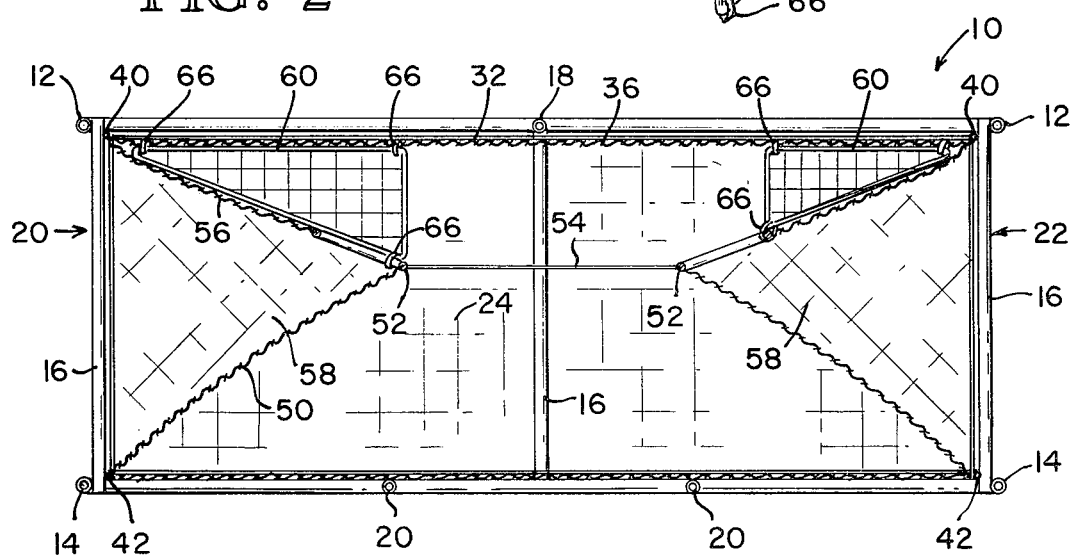
FIG. 2 is a cross-sectional view taken along the line 2—2 of FIG. 1.

A conventional crab trap 10, as illustrated in FIGS. 1 and 2, has an outline of a right rectangular prism. Its shape is defined by a pair of rectangular frames 12, 14 connected to each other by a plurality of support members 16. Additionally, a pair of perpendicular cross-supports 18 connect the sides of the frame 12 to each other. A pair of parallel cross-supports 20 connect to opposite sides of the frame 14 to each other. In geometrical terms, the edges formed by the frames 12, 14 are termed "base edges", the corners formed by the support members 16 are "lateral edges", the planes in which the frames 12, 14 lie are "bases" and the planes in which the support members 16 and the adjacent edges of the frames 12, 14 lie are "lateral faces". Two of the lateral faces 20, 22 form entrances for the crabs as explained in greater detail hereinafter. The remaining lateral faces 24, 26 are covered with netting 28, 30 which is mounted within respective frames 32, 34 which are releasably secured to the frames 12, 14. Similarly, the frames 12, 14 are covered with netting 36, 38 which extends between rectangular frames 40, 42, respectively, which are releasably secured to the frames 12, 14, respectively. The mesh of the netting 28 covering the right most lateral face 26 is substantially larger than the mesh covering the frames 12, 14 and lateral faces 20, 22, 24 in order to allow smaller species of crabs to escape through the lateral face 26 when the trap 10 is being used to fish for larger species of crab as required by law. The lateral face 26 thus forms an escapement end of the trap 10. As explained hereinafter, net panels having a smaller mesh cover the lateral face 26 when the trap 10 is used for fishing smaller species of crabs.

The entrance in the lateral faces 20, 22, as best illustrated in FIG. 2, are formed by a first panel of netting 50 extending from one base edge of the lateral face 20 to the far edge of an elongated entrance frame 52. With further reference to FIG. 1, the entrance frames 52 form elongated rectangles facing upwardly intermediate the bases formed by the frames 12, 14. The entrance frame for the entrance at lateral face 20 is connected to the entrance frame 52 for the entrance at lateral face 22 by a pair of lines 54. A second panel of netting 56 extends from the opposite base edges of lateral faces 20, 22 to the closer longitudinal edge of the entrance frame 52. The panel 50 forms the floor of the entrance tunnel while the panel 56 forms a roof. Third panels 58 extend between opposite lateral edges of the lateral faces 20, 22 to respective shorter sides of the entrance frame 52. The crabs enter the trap by crawling along the upper surface of panel 50 through the opening formed by the entrance frame 52 and falling onto the base formed by the frame 14.

For large catches, it has been determined that a fairly high percentage of the crabs entering the trap, somewhere between 40% and 50%, manage to escape the trap after it becomes full by crawling upwardly along the third panels 58 onto the upper side of the second panels 56, through the opening formed by the entrance frame 52 and out along the upper surface of the panel 50. Attempts have been made to prevent crabs from escaping in this manner, but such attempts have always focused on the opening formed by the entrance frame 52. One approach places an angular plate along the longitudinal edge of the entrance frame 52 closest to the lateral faces 20, 22. The plate extends upwardly and inwardly to a point above the other longitudinal edge of the entrance frame 52. As crabs climb downwardly along the panel 56 they are prevented from reaching the opening formed by the frame 52 by the plate. Instead, they fall off the inner edge of the plate back into the trap. As mentioned above, the primary disadvantage of this approach is that the plate vibrates excessively when the trap is placed in the water thereby scaring the crabs so that they do not enter the trap. The other approach discussed above utilizes a plurality of spaced apart fingers pivotally mounted on the longitudinal edge of the frame 52 nearest the lateral faces 20, 22. The opposite ends of the fingers (not shown) rest upon the upper surface of the longitudinal edge of the frame 52 farthest from the lateral faces 20, 22. As a crab enters the trap from the panel 50 through the opening formed by the frame 52, the crab pivots the fingers upwardly. However, the fingers prevent the crab from leaving the trap since they are incapable of pivoting downwardly and the crab is incapable of pivoting the fingers upwardly from its position on the second panels 56. As mentioned above, the principal disadvantage of this approach is that crabs often appear unwilling to pivot the fingers upwardly in order to obtain entrance to the trap so that the yield of this approach is somewhat reduced.

The inventive technique for preventing crabs from escaping the trap approaches the problem in a markedly different manner. Instead of focusing on the opening formed by the frame 52, the inventive technique focuses on preventing the crabs from reaching the second panels 56. By utilizing this technique, the opening formed by the frame 52 is not modified or tampered with so that the trap is inherently incapable of reducing the desire of crabs to enter the trap as with conventional techniques.

Figure 3:
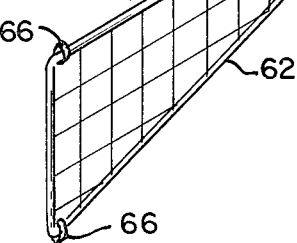
FIG. 3 is an isometric view of the baffle installed in the crab trap of FIG. 1

In order to prevent the crabs from crawling along the upper surface of the second panels 56, triangularly shaped panels 60 of netting are placed adjacent the third panels 56. As best illustrated in FIG. 3, the panels 60 include a triangularly shaped rigid frame 62 covered by netting 64. The frame 62 is secured to other portions of the trap by ties 66 or electrical cable type fasteners.

Two different placements for the panels 60 are possible. As illustrated with the entrance formed in the lateral face 20, the hypotenuse of each panel 60 can run along respective shorter sides of the entrance frame 52 and along the upper surface of the panel 56 to the lateral face 20. The shorter leg of the panel 60 extends from the entrance frame 52 to the netting 36 while the longer leg of the triangular panel 60 extends along the netting 36 to the lateral face 20. When the panel 60 is placed in this position, the crabs are able to crawl along the third panels 50, but they are unable to reach the upper surface of the second panels 56 in order to gain access to the opening surrounded by the entrance frame 52.

The other position of the panel 60 is illustrated with the entrance formed at the lateral face 22. In this position the hypotenuse of each panel 60 extends along the seam between the third panel 58 and the second panel 56. The short leg of the triangle extends from the entrance frame 52 to the mesh 36 covering the frame 12 while the long leg of the triangular panel 60 extends along the netting 36 to the lateral edge of the lateral face 22. When the panel 60 is in this position, the crabs are able to climb upwardly along the third panels 58, but they are unable to reach the upper surface of the second panel 56.

The panels 60 do not in any way inhibit the crabs from entering the trap through the entrance frame 52, they are relatively inexpensive and long-lasting, and they can be easily installed and removed.

Figure 4:
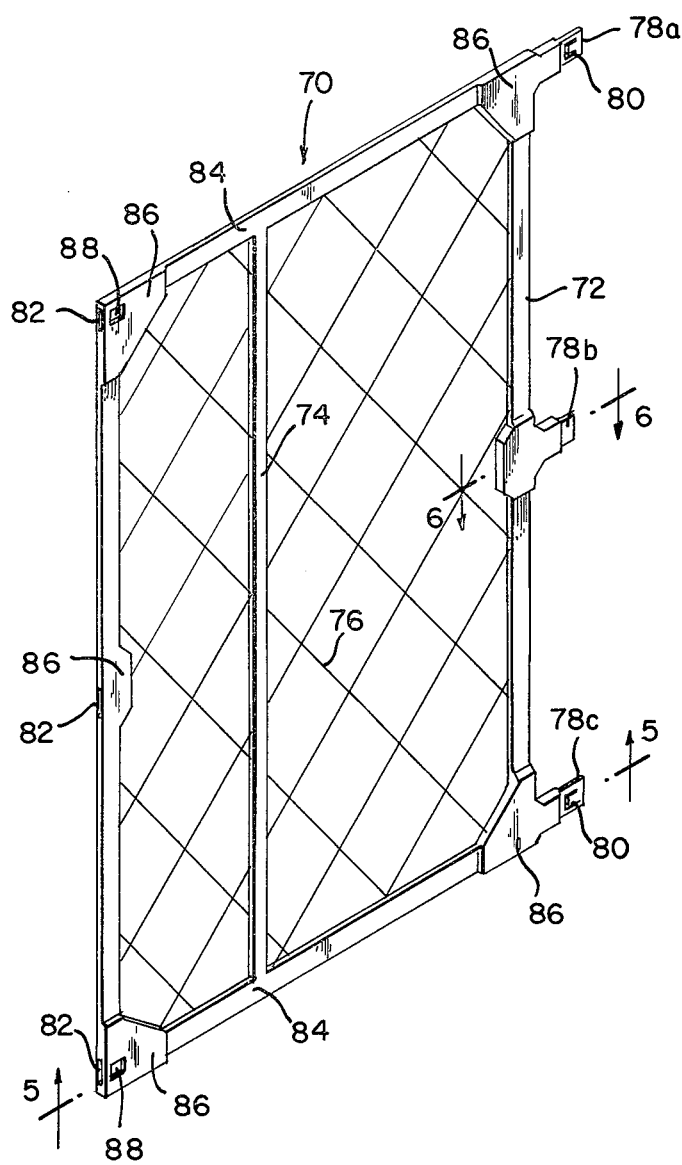
FIG. 4 is an isometric view of the reduced mesh size panel.
Figure 5:
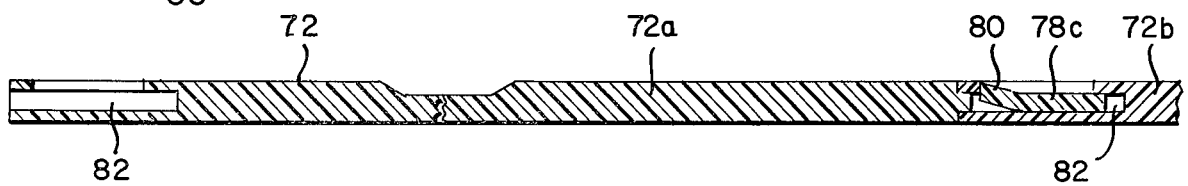
FIG. 5 is a cross-sectional view taken along the line 5—5 of FIG. 4.
Figure 6:
FIG. 6 is a cross-sectional view taken along the line 6—6 of FIG. 4.
Figure 11:
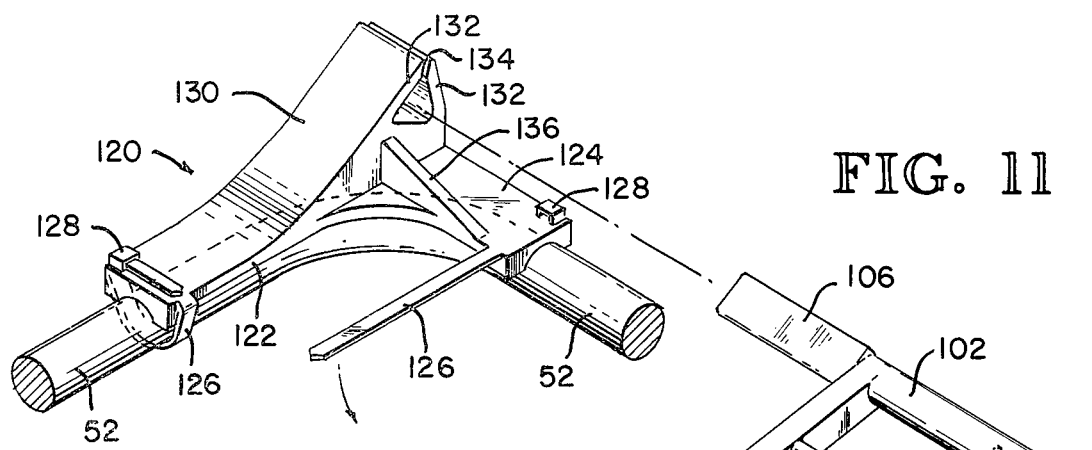
FIG. 11 is an isometric view showing an alternative technique for securing the panel about the entrance frame utilizing a bracket which is secured to the entrance frame.
Figure 12:
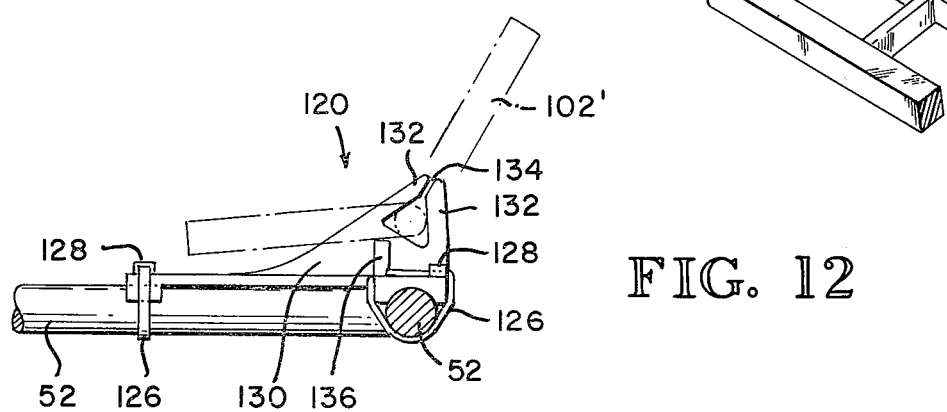
FIG. 12 is a side elevational view illustrating two positions of the panel mounted on the bracket of FIG. 11.

As mentioned above, the lateral panel 26 forming the escapement end is covered with a netting having a larger mesh than the remaining bases and lateral faces. When the trap is to be used for fishing smaller species of crab, the lateral face 26 must be covered with a smaller meshed netting. This is accomplished in the inventive crab trap by a plurality of rectangularly shaped panels 70 best illustrated in FIGS. 4-6. Each of the panels 70 is formed by a rigid rectangular frame 72 having a rigid cross member 74. A netting 76 covers the frame 72 and is secured thereto and to the cross member 74. One vertical edge of the frame 72 has formed therein a plurality of spaced apart tabs 78 two of which 78a,c include a resilient locking projection 80 to secure one panel 70 to another as explained hereinafter. The vertical edge of the frame 72 opposite the tabs 78 have formed therein a plurality of apertures 82 corresponding in number and position to the number and position of the tabs 78. As best illustrated in FIG. 5, the tabs 78a,c of one panel 72a fit into the apertures 82 of an adjacent panel 72b with the locking tab 80 projecting inwardly to prevent the tab 78c from being removed from the aperture 82. The center tab 78b, which does not contain a locking tab, merely fits into the correspondingly positioned aperture 82 as best illustrated in FIG. 6. Utilizing a plurality of interlocking panels instead of a single panel facilitates storage and replacement of damaged portions of the panels.

A unique aspect of the invention is the ability to vary the lateral size of the panels 70 so that they can be used with crab traps having a variety of sizes. In accordance with this feature, the panel 70 positioned at the end of a lateral face may be shortened by severing the horizontal members of the frame 72 adjacent the cross member 74 along the line 84. The panel 70 can then be secured to the adjacent support member 16 at the adjacent lateral edge by tying the cross member 74 to the support member 16.

The corners of the frame 72 and the center portion of each vertical frame member are provided with reinforcements 86, and the corner reinforcements 86 along the left edge of the panel 70 are provided with apertures 88 through which a string, electrical cable fastener or other fastening member is inserted.

As mentioned above, the width of the entrance opening formed by the entrance frame 52 (FIGS. 1 and 2) must be reduced when the crab trap 10 is being used to fish for smaller species of crabs. This inventive structure for easily and quickly performing this function is illustrated in FIGS. 7-13. With reference to FIG. 7, the structure 100 includes a panel 102 of a mesh or lattice construction. With reference also to FIG. 9, a pair of triangularly-shaped support pins 106 project from the panel 102 through a pair of anti-escape baffles 108 mounted at opposite shorter ends of the entrance frame 52. In the position illustrated in FIG. 7, the panel 102 covers a substantial portion of the opening 110 formed by the entrance frame 52 so that the width of the opening 110 is substantially less than its width as illustrated in FIGS. 1 and 2.

With reference to FIG. 8, a support 112 is formed in the anti-escape baffle 108 to receive the triangularly-shaped pins 106 and support the panel 102. The support 112 includes a pair of upwardly projecting legs 114 separated from each other by a small gap 116. The legs 114 are formed by a resilient material so that they may move apart from each other to increase the width of the gap 116 when the panel 102 is rotated about the axis of the pins 106. However, the resilience of the legs 114 maintains the position of the panel 102 constant in either the fully open or the partially closed position.

As illustrated in FIG. 10, the panel 102 may be rotated to its partially closed position to reduce the width of the entrance opening 110 or it may be rotated upwardly to the open position 102' so that the opening 110 corresponds to the full width of the entrance frame 52. In its fully open position 102' the panel 102' does not, in any manner, interfere with crabs entering the trap so that the yield of the trap is not adversely affected. Since the panel 102 is formed by a lattice instead of a solid sheet, it does not vibrate when the trap is placed in a current.

The panel 102 may be used with or without anti-escape baffles 108. Where anti-escape baffles are not employed, the mounting structure illustrated in FIGS. 11 and 12 may be used. The mounting structure includes a bracket 120 having a pair of perpendicular legs 122, 124 each of which include a semi-cylindrical cutout adapted to receive the entrance frame 52. The legs 122, 124 are secured to the entrance frame 52 by flexible straps 126 integrally formed with the legs 122, 124 which are received by respective locking brackets 128. The tabs 126 and locking brackets 128 are of conventional design and are most frequently employed to bundle electrical cables. One of the legs 122 carries a mount 130 formed by a pair of resilient legs 132 separated from each other by a small gap 134. Like the legs 114 of the embodiment of FIGS. 7 and 8, the legs 132 are resilient so that they are capable of moving toward and away from each other. A fillet 136 carried by the leg 124 extends to the side of the mount 130 to provide additional strength.

The triangularly-shaped pin 106 projecting from the panel 102 is inserted in the triangularly-shaped opening formed between the legs 132. Consequently, the panel 102 may be pivoted between a partially closed position 102 (FIG. 12) to the full open position 102'.

Figure 13:
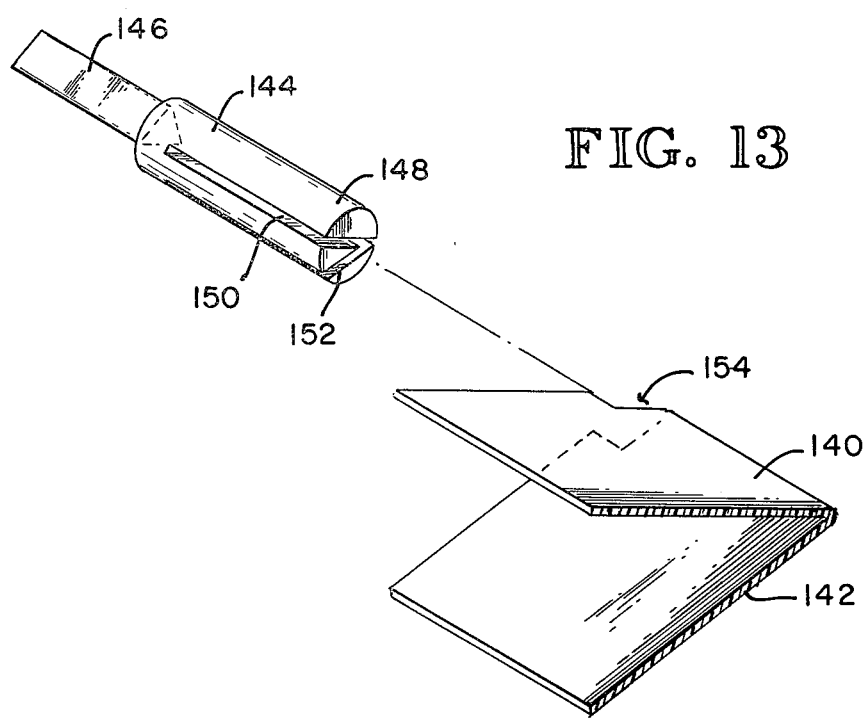
FIG. 13 is an isometric view showing an adapter pin for mounting an angular deflection plate about the entrance opening in either of two positions.

As mentioned above, an angular plate is frequently mounted above the entrance frames 52 of conventional crab traps to prevent the crabs from escaping. This same technique may be employed in combination with the variable width entrance opening as illustrated in FIG. 13. In accordance with this feature, a pair of planar members 140, 142 intersecting each other at an acute angle are mounted on an adapter pin 144. The adapter pin 144 includes a triangularly shaped portion 146 and a cylindrical portion 148 having a pair of slots 150, 152 intersecting each other at the same acute angle as do the planar members 140, 142. The planar members 140, 142 are secured to the adapter pin 144 by inserting the members 140, 142 into the slots 150, 152, respectively. Rectangularly-shaped cutouts 154 are formed at the apex of the acute triangle to provide clearance between the planar members 140, 142 and the outer end of the cylindrical portion 148. Otherwise, it would be necessary for the slots 150, 152 to extend the entire length of the cylindrical portion 148 which would markedly reduce the strength of the cylindrical portion 148. After the planar members 140, 142 have been secured to the adapter pin 144, the triangularly shaped portion 146 of the adapter pin 144 is inserted into the triangularly shaped opening formed between the legs 132 of the bracket 120 of FIGS. 11 and 12. When the planar members 140, 142 are placed in the position illustrated in FIG. 13, the planar member 142 reduces the width of the opening formed by the entrance frame while the other planar member 140 prevent crabs from escaping the trap as described above. Specifically, the crabs crawl along the upper surface of the second panel 56 (FIG. 2) until they reach the planar member 140. They then crawl along the upper surface of the planar member 140 and fall off the end of the planar member 140 back into the trap. When the planar members 140, 142 and adapter pin 144 are pivoted clockwise as illustrated in FIG. 13, the planar member 142 does not obstruct the opening formed by the entrance frame and the planar member 140 continues to prevent crabs from escaping.

The panel for reducing the width of the entrance opening, as illustrated in FIGS. 7-13, has a lifetime approximating the lifetime of the crab trap so that continual replacement is not required. Furthermore, it can be pivoted between its two positions in a matter of seconds by merely reaching through the entrance tunnel for the trap thereby minimizing wasteful down time.

I claim:

1. In a crab trap of the type having an outline of a right prism formed by four lateral faces extending between first and second bases, said trap further including an opening formed along one of said lateral faces and terminating in an elongated rectangular entrance frame having two parallel elongated edges extending between two parallel shorter edges, said frame facing upwardly intermediate said bases with the longer edges of said entrance frame being generally parallel to said lateral face, said opening including a first panel extending inwardly from one edge of said lateral face adjacent said first base and terminating at the elongated edge of said entrance frame farthest from said lateral face, a second panel extending inwardly from one edge of said lateral face adjacent said second base and terminating at the elongated edge of said entrance frame closest to said lateral face, and a pair of third panels each extending inwardly from one lateral edge of said lateral face and terminating at a respective edge of said entrance frame whereby placement of said crab trap on said first base allows crabs to crawl up said first panel and into the interior of said trap through said entrance frame, the improvement comprising:

means for preventing crabs from escaping from said trap through an escape route by crawling along said third panels onto said second panel, and along said second panel to said entrance frame, said escape prevention means comprising a pair of baffles mounted between opposite edges of said entrance frame and spaced apart locations on said lateral face to block said escape route thereby preventing crabs from escaping from said trap.

2. The crab trap of claim 1 wherein said baffles are triangularly shaped.

3. The crab trap of claim 1 wherein said baffles have the shape of a right triangle with the hypotenuse of said triangles extending along respective shorter edges of said entrance frame and said second panel to said lateral face, one leg of each triangle extending from opposite sides of said entrance frame to said second base, and the other leg of each triangle extending along said second base to said lateral face such that said baffles prevent said crabs from crawling along said second panel to said entrance frame.

4. The crab trap of claim 3 wherein said panels comprise a sheet of netting extending across a rigid triangular frame.

5. The crab trap of claim 1 wherein said baffles have the shape of a right triangle with the hypotenuse of said triangles extending from opposite sides of said entrance frame along respective third panels to respective lateral edges of said lateral face, one leg of each triangle extending from opposite sides of said entrance frame to said second base, and the other leg of each triangle extending along said second base, and the other leg of each triangle extending along said second base to respective lateral edges of said lateral face such that said baffles prevent said crabs from crawling onto said second panel from said third panels.

6. The crab trap of claim 5 wherein said panels comprise a sheet of netting extending across a rigid triangular frame.

7. The crab trap of claim 1 wherein said bases and all but one of said lateral faces are formed by netting having a first sized mesh and the remaining lateral face is formed by a netting having a second, substantially larger sized mesh, and wherein said crab trap further includes a plurality of panels of netting having a mesh of said first size releasably secured to said bases and to adjacent lateral faces so that said trap may be easily converted from a trap for one variety of crab to a trap for a different variety of crab.

8. The crab trap of claim 7 wherein each of said panels comprise a sheet of netting extending across a rectangular rigid frame formed by a pair of horizontal frame members extending between a pair of vertical frame members, said frame further including a rigid cross member to which said netting is secured extending from one of said horizontal frame members to the other such that said panels may be utilized with a relatively smaller trap by severing said horizontal frame members adjacent said cross member.

9. The crab trap of claim 8 wherein one vertical frame member of each panel includes a plurality of tabs projecting therefrom and the other vertical frame member of each panel includes a plurality of apertures corresponding in number and position to the number and position of said tabs, the apertures for one panel being adapted to receive the respective tabs of an adjacent panel to releasably secure said panels to each other.

10. The crab trap of claim 9 further including a locking mechanism for releasably holding at least some of said tabs within their respective apertures.

11. The crab trap of claim 1 further including a panel for reducing the width of the entrance opening formed by said entrance frame, said panel including an elongated, generally planar member having a pair of support pins projecting from opposite ends thereof, said pins being carried by said baffles such that said panel may be pivoted between a partially closed position in which the entrance opening is obstructed and a fully open position in which the entrance opening is unobstructed.

12. The crab trap of claim 11 wherein said pins are triangularly shaped, and a mount is formed on each of said baffles, said mount including a pair of resilient legs projecting toward each other to form a generally triangularly-shaped opening adapted to receive said pins such that movement of said panel toward and away from said entrance frame causes said pin to pivot within said opening thereby causing said resilient legs to move toward and away from each other.

13. The crab trap of claim 1 further including means for varying the width of the entrance opening formed by said entrance frame, comprising a generally elongated panel having one of its longitudinal edges pivotally secured to said trap about an elongated edge of said entrance frame such that said panel may be pivoted toward said entrance frame to a partially closed position or away from said entrance frame to a full open position.

14. The crab trap of claim 13 wherein a pair of support pins project from opposite ends of said panel along said pivotally mounted edge, said pins being carried by respective baffles positioned at opposite ends of said entrance frame.

15. The crab trap of claim 13 wherein a pair of support pins project from opposite ends of said panel along said pivotally mounted edge, said pins being carried by respective brackets mounted on said entrance frame.

16. In a crab trap of the type having an outline of a right rectangular prism formed by four lateral faces of netting extending between a pair of bases covered by netting to form an enclosure, the mesh of the netting covering said bases and all but one said lateral faces being of a first size and the mesh of the netting covering the remaining lateral face being of a second, substantially larger size, the improvement comprising a plurality of net panels having a mesh of said first size, said panels being releasably secured to each other and to said enclosure across said remaining lateral face so that said trap may be easily converted from a trap for one species of crab to a trap for a different species of crab.

17. The crab trap of claim 16 wherein each of said panels comprise a sheet of netting extending across a rectangular rigid frame formed by a pair of horizontal frame members extending between a pair of vertical frame members, said frame further including a rigid cross member to which said netting is secured extending from one of said horizontal frame members to the other such that said panels may be utilized with a relatively smaller trap by severing said horizontal frame members adjacent said cross member.

18. The crab trap of claim 17 wherein one vertical frame member of each panel includes a plurality of tabs projecting therefrom and the other vertical frame member of each panel includes a plurality of apertures corresponding in number and position to the number and position of said tabs, the apertures for one panel being adapted to receive the respective tabs of an adjacent panel to releasably secure said panels to each other.

19. The crab trap of claim 18 further including a locking mechanism for releasably holding at least some of said tabs within their respective apertures.

20. In a crab trap of the type having an outline of a right prisim formed by four lateral faces extending between first and second bases, said trap further including an opening formed along one of said lateral faces and terminating in an elongated rectangular entrance frame having two parallel elongated edges extending between two parallel shorter edges to form an entrance opening, said frame facing upwardly intermediate said bases with the longer edges of said entrance frame being generally parallel to said lateral face means for varying the width of said entrance opening comprising:
 a generally elongated panel;
 a pair of triangularly shaped support pins projecting from opposite ends of said panel along an elongated edge thereof;
 a pair of generally L-shaped brackets having first and second perpendicular legs extending along and secured to adjacent sides of said support frame, said brackets further including a triangularly shaped aperture receiving respective support pins, said apertures being formed by a pair of resilient legs projecting toward, but separated from, each other such that rotation of said support pin as said panel is moved between its full open and its partially closed positions causes said legs to move toward and away from each other while the resilient forces of said legs cause said panel to remain in a fixed position such that said panel may be pivoted toward said entrance frame to a partially closed position and away from said entrance frame to a full open position.

21. In a crab trap of the type having an outline of a right prism formed by four lateral faces extending between first and second bases, said trap further including an opening formed along one of said lateral faces and terminating in an elongated rectangular entrance frame having two parallel elongated edges extending between two parallel shorter edges to form an entrance opening, said frame facing upwardly intermediate said bases with the longer edges of said entrance frame being generally parallel to said lateral face, the improvement comprising means for varying the width of said entrance opening including a generally elongated panel formed by a pair of elongated, rectangular sheets intersecting each other at an accute angle, said sheets being secured to said trap with their intersecting edges pivotally mounted about a longitudinal edge of said entrance frame such that said panel may be pivoted toward said entrance frame to a partially closed position and away from said entrance frame to a full open position.

22. The crab trap of claim 21 wherein said sheets are carried by an adapter pin having a pair of instersecting slots adapted to receive respective sheets and a support member pivotally mounted to said crab trap.

* * * * *